Nov. 24, 1964  A. P. V. LACHERÉ  3,157,967
MACHINE FOR WORKING THE SURFACE OF ELONGATED WORKPIECES
Filed April 25, 1961  7 Sheets-Sheet 1

ANDRÉ P. V. LACHERÉ
INVENTOR.

BY Karl F. Ross

AGENT

Nov. 24, 1964   A. P. V. LACHERÉ   3,157,967
MACHINE FOR WORKING THE SURFACE OF ELONGATED WORKPIECES
Filed April 25, 1961   7 Sheets-Sheet 2

ANDRÉ P. V. LACHERE
INVENTOR.

BY

Karl J. Ross
AGENT

Nov. 24, 1964 A. P. V. LACHERÉ 3,157,967
MACHINE FOR WORKING THE SURFACE OF ELONGATED WORKPIECES
Filed April 25, 1961 7 Sheets-Sheet 4

ANDRÉ P. V. LACHERÉ
INVENTOR.

BY
Karl F. Ross
AGENT

United States Patent Office 3,157,967
Patented Nov. 24, 1964

3,157,967
MACHINE FOR WORKING THE SURFACE OF
ELONGATED WORKPIECES
André Paul Victor Lacheré, 13 Rue des Victor Tournelles,
Annemasse, Haute-Savoie, France
Filed Apr. 25, 1961, Ser. No. 105,431
Claims priority, application France Apr. 25, 1960
8 Claims. (Cl. 51—144)

Various devices are known for the shaping, polishing and reconditioning of tubes, bars or the like, these devices generally using the finishing process known as "centerless" grinding or lapping.

It is usually regarded as a disadvantage of the above process that it must be carried out at a slow speed, owing to the individual machining of workpieces, the obligation to start anew in the machining of each piece in order to suppress a partial defect, the difficult rotary adjustment of the workpieces, the need for rotation to obtain their perfect machining, the impossibility of machining the workpieces with a shape other than cylindrical, the production of helicoidal streaks and, finally, the unavoidable use of complex tools.

The present invention proposes to overcome these difficulties in a simple and efficient way, affording high operating speed by enabling simultaneous and, if desired, automatic machining of several pieces, insuring a perfect surfacing and providing the possibility of a partial reworking of surfaces insufficiently machined; it is also applicable to the machining of tubes, bars and the like with a shape other than cylindrical. Besides, the work may be performed with relatively inexpensive material and its supervision will be particularly easy, owing to the provision of simplified means for machining, holding and withdrawing the workpieces.

According to the invention, a wheeled carriage moves along two rails perpendicular to the path of an endless abrasive tape which is wound around two rollers, one of these rollers being rotated by means of a suitable power source such as an electric motor. This carriage includes two transverse end bars perpendicular to the rails, one of the bars carrying a set of driving pins rotatable by, for example, an electric motor coupled therewith via a chain-type transmission and a belt, the other bar carrying a set of idler pins respectively coaxial with the corresponding driving pins.

The tubes, bars or other elongated workpieces to be machined are mounted alongside one another on the carriage, each workpiece being supported on a respective idler pin and on an aligned driving pin designed to transmit rotary motion to it. They are then brought into contact with the surfacing means, i.e. with the abrasive tape, by proper adjustment of the height of the carriage relative to that of the tape which moves, preferably, in opposition to the peripheral motion of the workpieces. Thus, by a simple displacement of the carriage along its rails, the desired shaping, polishing, reconditioning etc. of the workpieces throughout their length is achieved.

The relative adjustment of the height of the carriage and that of the surfacing means may be brought about in a variety of ways. Thus, the carriage may be provided with legs of adjustable length in order to accommodate workpieces of different thickness and/or taper. For workpieces whose shape is not uniformly cylindrical or conical, on the other hand, it is possible to provide the carriage-supporting rails with ramps which, in certain positions during a reciprocating traverse of the carriage, are ascended by one wheel pair to bring about a tilted position in which the abrasive tape operates on a tapered workpiece surface. The mechanism for reciprocating the carriage includes, in such cases, advantageously a power-driven runner which rides on an auxiliary track extending alongside the main track engaged by the carriage wheels, the coupling between the runner and the carriage being such as to facilitate relative vertical motion affording the desired degree of carriage mobility and tiltability.

Another feature of the invention resides in the provision of special means for rapidly bringing the operating surface of the abrasive tape to bear upon the workpieces after they have been properly positioned on their pin-shaped holding elements. This arrangement includes a vertically movable support for a set of pressure elements, such as rollers or bars, disposed between the horizontal runs of the endless tape and adapted to be raised or lowered for deflecting the tape into contact with the workpieces and disengaging it from them. These pressure elements may be aligned with the axes of the holding pins, and thus with the workpieces themselves, in which event they should be provided with a suitable cushioning layer or brush in contact with the inner (non-abrasive) tape surface; alternatively, they may be inter-leaved with the workpiece axes and, in that case, may bear upon the tape not directly but through the intermediary of a flexible and tensionable belt.

The above and other features of the invention will now be described in greater detail with reference to the accompanying drawing in which.

Figure 1:
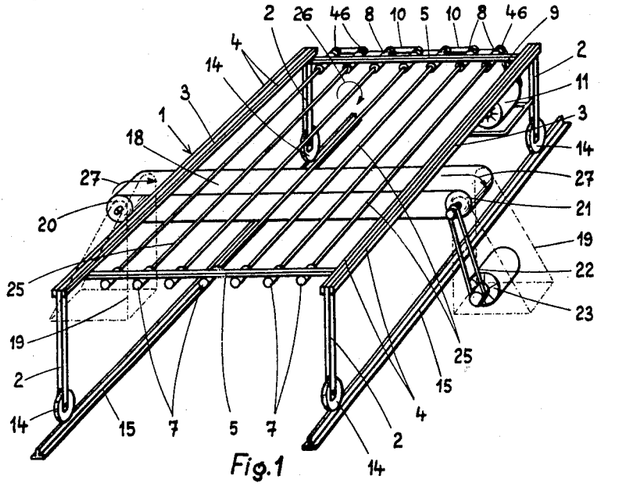
FIG. 1 is a perspective view of a machine according to the invention, showing the overall organization thereof.
Figures 4, 5, 6:
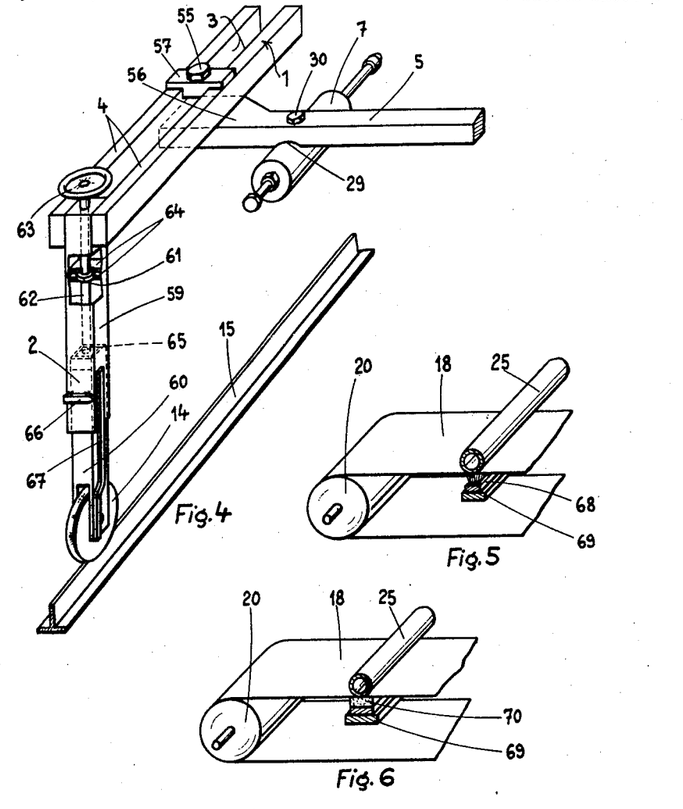
FIG. 4 is a fragmentary perspective view of a carriage forming part of the machine having the overall structure shown in FIG. 1.
FIGS. 5, 6, 7 and 8 are fragmentary perspective views of different arrangements for establishing contact between a set of workpieces and an abrasive tape in a machine of the type shown in FIG. 1.

The machine illustrated in FIG. 1 comprises a carriage 1 provided with two pairs of legs 2, fore and aft, which depend from the corners of a rectangular frame composed of a pair of side members 4 and transverse end bars 5; each of the side members 4 consists of a pair of parallel bars separated by a channel 3, as best seen in FIG. 4, this space serving to receive the tops of legs 2 bracketed by the members 4. The channel 3 between the members 4 also accommodates, near each leg 2, a respective bolt 55 (FIG. 4) which traverses a T-shaped block 57 supported by the members 4, bolt 55 being screwed into an enlarged extremity 56 of one of the two cross-bars 5 to fasten it to the side member 4; thus, the bars 5 are adjustable along side members 4 to adapt the dimensions of the carriage frame to the length of the workpieces to be machined. Each bar 5 is formed along its underside with a series of arcuate recesses 29 in which there are lodged a set of workpiece-holding assemblies 7 and 8 (FIG. 1), respectively, disposed in a common horizontal plane and in mutual alignment at opposite ends of the carriage; bolts 30 (FIGS. 2–4) serve to secure the units 7 and 8 to the respective bar 5 within the corresponding recesses 29.

Figure 2:
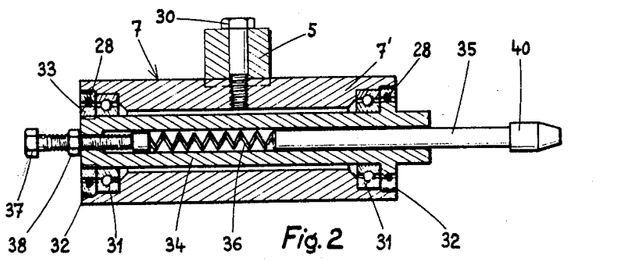
FIGS. 2 and 3 are axial sectional views, drawn to a larger scale, of two workpiece-holder assemblies forming part of the machine of FIG. 1.

The construction of each holding unit 7 is best shown in FIG. 2. This unit comprises a cylindrical housing 7' in which there is journaled, through the intermediary of bearings 31, a sleeve 34 having a stem 35 slidably disposed therein. Bearings 31 are held in place by locking rings 32 respectively surounding a collar 33 and a shoulder 33' on sleeve 34, a pair of gaskets 28 projecting into the intervening annular clearances. A bolt 37 is adjustably threaded into one end of sleeve 34 and is fixed in position by a nut 38 to control the pressure of a spring 36 disposed between the bolt and the stem 35. The latter terminates in a chuck 40 here shown to have a tapering point for introduction into a tubular workpiece 25 (FIG. 1), the stem 35 thus constituting a nondriven supporting pin for such workpiece.

Figure 3:
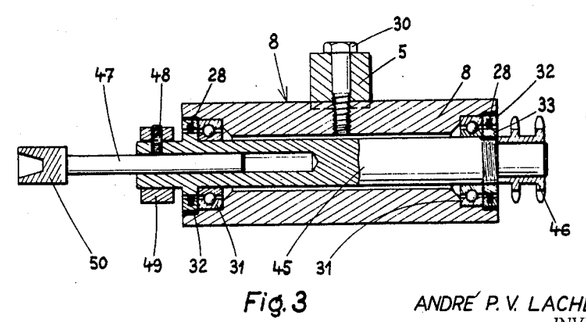

The opposite holders 8, illustrated in detail in FIG. 3, are generally similar to the holders 7 and comprise each a cylindrical housing 8' with bearings 31 rotatably supporting therein a partly tubular shaft 45. A pair of sprockets 46 are carried on the rearwardly projecting closed end of shaft 45 whose forward end has a stem 47 slidably disposed therein. Stem 47 terminates in a chuck 50 with a frustoconical recess adapted to receive tht proximal end of a workpiece 25. The forwardly projecting end of shaft 45, reinforced by a ring 49, carries a setscrew 48 for holding the stem 47 in a fixed axial position, this stem serving as a driving pin for the workpiece engaged thereby.

To mount a workpiece on its holder pair 7, 8, one of its ends is first inserted into the chuck 50 whereupon stem 35 is retracted, against the force of spring 36, until its chuck 40 can engage the other end of the workpiece. The opposite procedure is followed when the workpiece is to be removed.

As further shown in FIG. 1, small wheels or casters 14 on the lower ends of the legs 2 ride on a pair of rails 15 which extend parallel to the side members 4 of the carriage frame. An endless abrasive tape 18, supported on a pair of rollers 20 and 21, extends parallel to the end bars 5 so as to be perpendicular to a set of elongated workpieces 25 supported by respective holders 7 and 8. Rollers 20 and 21 are journaled in two brackets 19 of which one also supports a drive motor 23 linked with roller 21 via a transmission belt 22. Another motor 11 is operatively connected, by a belt 9, with a pulley 9' (see FIG. 15) on the shaft 45 of one of the workpiece holders 8, all the shafts 45 of these holders being interconnected for joint rotation by chains 10 engaging their sprockets 46. The sense of rotation of motors 11 and 23 is such that both the tape 18 and the workpiece 25 are driven clockwise, as indicated by the arrows 27 and 26 in FIG. 1, so that their cooperating surfaces move in opposite directions.

FIG. 4 illustrates the manner in which the length of the legs 2 may be varied to change the relative elevation of the tape 18 and the workpieces 25. To this end, the leg 2 shown in FIG. 4 is composed of two telescoped sections 59 and 60 of square profile, the female upper section 59 being attached to the bars 4 whereas the male lower section 60 straddles the caster 14 with its bifurcate end. A spindle 62 is provided with a collar 61 bracketed by two transverse plates 64 inside section 59, the lower end of this spindle being screwed into a threaded block 65 made integral (e.g. by welding) with section 60. A handwheel 63 on the projecting upper end of spindle 62 is rotatable to vary the relative position of sections 59 and 60, thereby altering the effective length of the leg 2; rotation of handwheel 63, therefore, enables workpieces of various shapes to be brought into proper position with reference to the upper operating surface of tape 18. A marker 66 on leg section 59 cooperates with a scale 67 on leg section 60 to indicate the position of relative adjustment thereof.

As shown in FIGS. 5–10, means may be provided for rapidly and uniformly bringing the upper run of tape 18 to bear upon the workpieces 25 to be machined. According to FIG. 5, there is provided for this purpose a brush 68 disposed inside the tape 18, thus between the two rollers 20 and 21 thereof, in direct alignment with a workpiece 25, the brush being mounted on a vertically adjustable support 69. In the system of FIG. 6, the brush 68 has been replaced by a cushioning layer 70 of felt or the like. The means for raising and lowering the supports 69 may be similar to those described hereinafter in conjunction with FIGS. 7–10.

Figure 7:
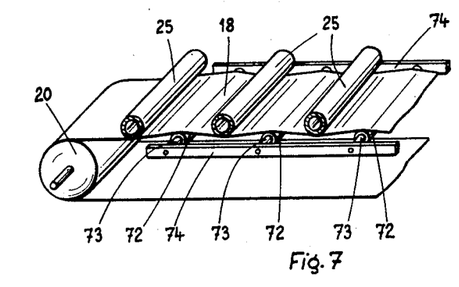

In the modified arrangement of FIG. 7, the supports 69 of FIGS. 5 and 6 have been replaced by rollers 72 extending parallel to the workpieces 25 but in interleaved relationship therewith, these rollers having shafts 73 journaled between the upper and lower runs of tape 18. Frame 74 is adjustable in height by any suitable mechanism as such, for example, the one described hereinafter for the adjustment of a similar frame 128 shown in FIGS. 8–10.

Figure 8:
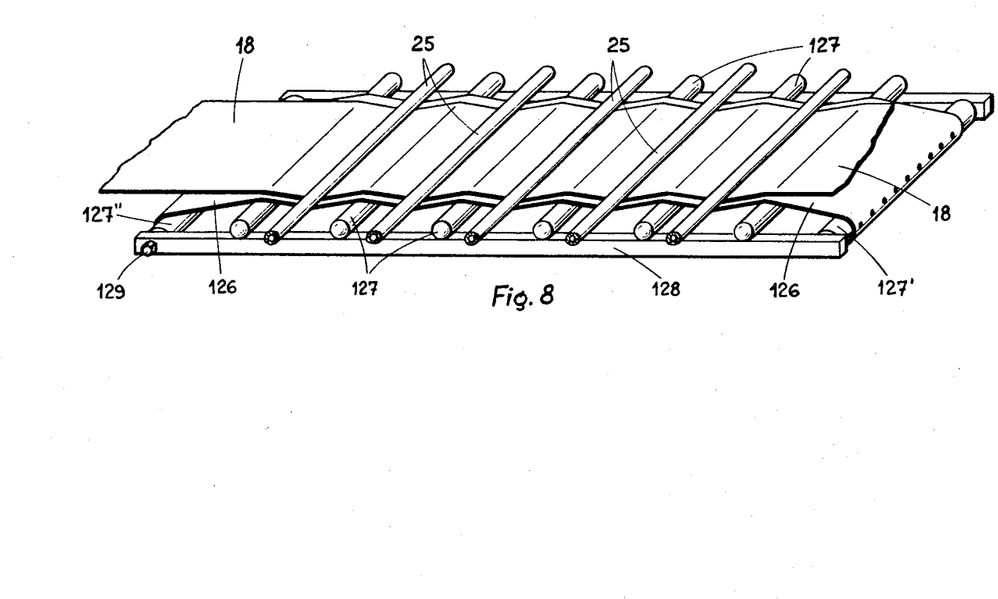
Figure 9:
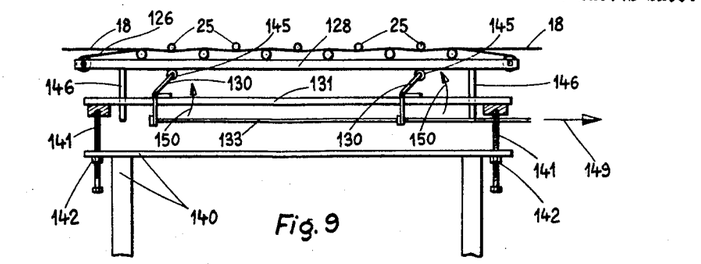
FIGS. 9 and 10 are a side-elevational view and a top view, respectively, of the assembly shown in FIG. 8.
Figure 10:
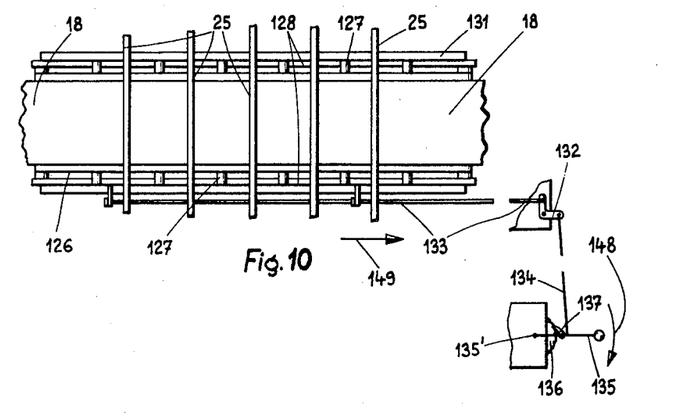

The vertically adjustable pressure elements included in the systems of FIGS. 8–10 have the form of bars 127 positioned, with reference to the workpieces 25, in the same manner as the rollers 72 of FIG. 7; they are rigid with frame 128 and are embraced by an endless belt 126 whose upper surface bears upon the underside of the upper run of tape 18 when the two endless members 18, 126 are closely juxtaposed for the machining of the workpieces 25. Belt 126 is further wound around two end rollers 127' and 127", roller 127' being fixed whereas roller 127" is eccentrically pivoted on frame 128 and can be immobilized in any pivotal position by means of nuts 129 (only one shown) to adjust the tension of belt 126. It will be apparent that the provision of belt 126 distributes the pressure of the assembly 127, 128 more evenly upon the working portion of tape 18 and that, if desired, the other end roller 217' could also be made adjustable in order to enable a displacement of belt 126 relative to the bars 127 so as to shift the points of maximum wear on that belt.

As shown in FIGS. 9 and 10, the assembly 127, 128 is guided for vertical movement on a plate 131 by means of depending studs 126 slidably received in that plate, the latter being supported by bolts 141 which are screwed into a base 140 and are fixed in position by nuts 142. Fulcrumed on plate 131 are a pair of bell-crank levers 130 with rollers 145 bearing upon the underside of frame 128; the levers 130 are interlinked by a rod 133 which is articulated to an elbow 132 having a further rod 134 linked therewith. A control lever 135, which may be manually operable, is swingable about a fulcrum 135' or articulated to rod 134 in order to move the rod 133 to the right, i.e. in the direction of arrow 149, upon being rotated clockwise (FIG. 10) about its pivot as indicated by the arrow 148. Lever 135 may be maintained in its selected position by suitable detent means here shown as a pawl 137 cooperating with a sawtooth segment 136. It will be apparent that such a motion of lever 135 causes the levers 130 to swing counterclockwise as indicated by the arrows 150 in FIG. 9, thereby elevating the frame 128 toward the tape 18. Conversely, a counterclockwise rotation of lever 135 will permit disengagement of belt 126 on frame 128 from tape 18. The operating pressure exerted by the belt 126 upon tape 18 will, of course, be determined jointly by the position of lever 135 and the setting of the screws 141.

Figure 11:
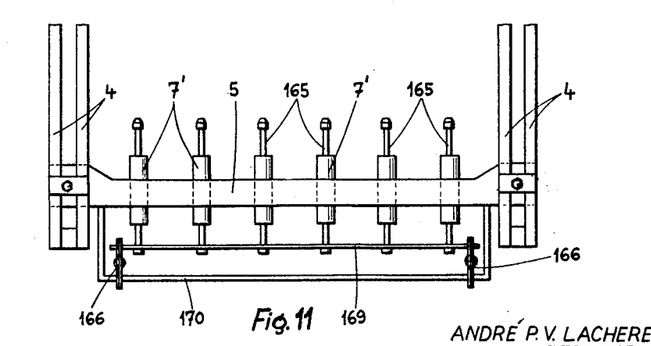
FIG. 11 is a top view of part of the carriage, showing its mechanism for simultaneously withdrawing one set of workpiece-holding pins.
Figure 12:
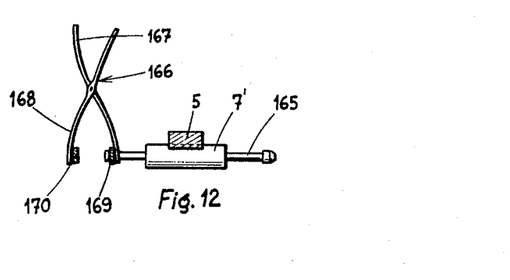
FIG. 12 is a detail view illustrating, in side elevation, the withdrawing mechanism of FIG. 11.

FIGS. 11 and 12 show an arrangement for facilitating joint withdrawal of all the nondriven or idler pins from the worpieces from the forward ends of the workpieces 25. The holder cylinders 7' shown in these figures have substantially the same construction as in FIG. 2, yet the stems 35 thereof have been replaced by throughgoing stems 165 whose forwardly projecting ends remote from the workpieces are interconnected by a horizontal bar 169 parallel to bar 5. A yoke 170 on bar 5 is connected with bar 169 by means of two scissor linkages 166 each comprising an arm 167 rigid with bar 169 and an arm 168 rigid with the yoke 170. Thus, a simultaneous squeezing of the free upper ends of the levers 167, 168 of both linkages 166 will cause all the stems 165 to be withdrawn from the engaged workpieces so that the latter may be removed and replaced.

Figure 13:
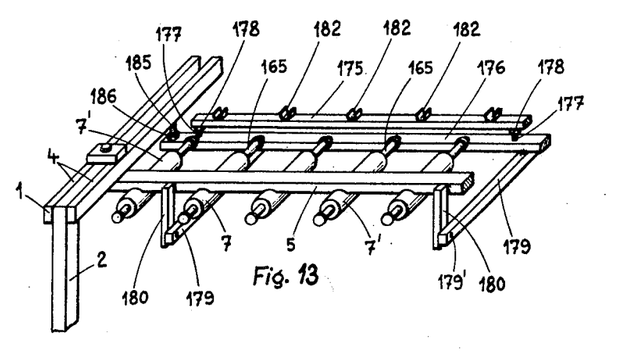
FIG. 13 is a fragmentary perspective view of the carriage, illustrating a movable support for the workpieces.

In FIG. 13 there is illustrated a temporary rest for the workpieces on which they may be supported at the time of their disengagement from the front holders 7. This arrangement comprises a horizontal bar 175 which is adjustably carried on another bar 176 through the intermediary of bolts 177 and nut 178, bar 177 being rigid with two arms 179 which in turn are pivoted at 179' on arms 180 depending from crossbar 5. A set of trough-shaped elements 182, facing respective stems 165, are disposed beyond these stems on the bar 175 to receive the front portions of respective workpieces 25 (FIG. 1). A threaded stud 185 locked in position by a nut 186 projects upwardly from supporting bar 176 into contact with one of the members 4 to limit the upward swing of the assembly 176–179; thus, the highest level of the temporary workpiece supports 182 will be determined by the setting of bolts 177 or 185. The assembly may be swung about its fulcra 179' by, for example, a hand-operated lever (not shown) and may be fastened in its raised position by screws or other appropriate means likewise not illustrated; during the machining of the workpieces it may be held withdrawn in a lowered position by gravity or other means.

Figure 14:
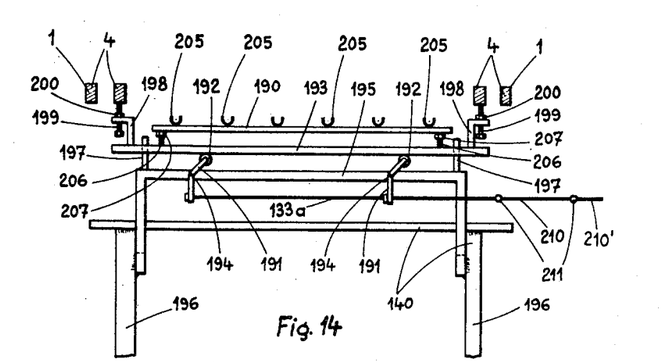
FIG. 14 is a front-elevational view illustrating a modification of the arrangement of FIG. 13.

In FIG. 14 there has been shown a similar temporary rest comprising a lower bar 193, an upper bar 190 supported thereon by means of bolts 206 and nuts 207, a set of workpiece supports 205 and a pair of brackets 198 on bar 193 which are engaged by bolts 199 depending from side members 4 for limited vertical displacement between the heads of these bolts and nuts 200 thereon. Bar 193 is guided by studs 197 rising from a yoke 195 which is rigid with the base 140 and secured to uprights 196 thereof; a pair of bell-crank levers 191, fulcrumed at 194 on the yoke 195, are interconnected by a rod 133a and carry rollers 192 bearing upon the underside of bar 193, the control of rod 133a being similar to that of rod 133 in FIGS. 9 and 10. The rod 133a is shown provided with extensions 210, 210' bonded together at 211, this construction being also representative of that of rod 133 and being designed to facilitate the adjustment or replacement of tape 18.

Figure 15:
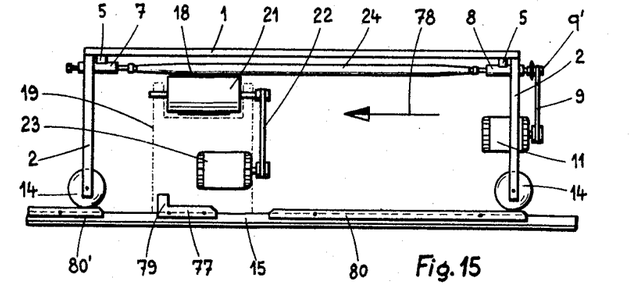
FIG. 15 is a side-elevational view of the machine of FIG. 1, illustrating the provision of rail-supported ramps for shaping workpieces of tapering configuration.

FIG. 15 illustrates the machining of tapering workpieces 24, in lieu of the cylindrical workpieces 25 shown in preceding figures, with the aid of ramps 80, 80' on rails 15 adapted to be ascended by the wheels 14 of the carriage 1 for the purpose of machining the large-diameter main portions of the workpieces. Another such ramp 77, terminating in an abutment 79 for the wheels 14, causes the workpiece holder 8 to be lifted clear off the tape 18 at the end of a machining cycle in which the carriage 1 is moved to the left, i.e. in the direction of arrow 78; the gaps present between the ramps 77, 80 and 80' allow the wheels 14 to be lowered for the machining of the reduced extremities of the workpieces. Although the ramps shown in FIG. 15 change the level of the workpieces in a relatively abrupt fashion, the flexibility of the tape 18 will produce a smooth transition between workpiece sections of different thickness.

Figures 16, 17:
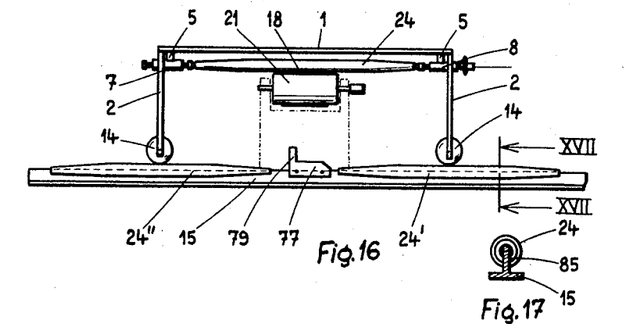
FIG. 16 is a view similar to FIG. 15, showing a modified form of ramps.
FIG. 17 is a cross-sectional view taken on line XVII—XVII of FIG. 16.

In FIG. 16 the ramps 80, 80' of FIG. 15 have been replaced by tubular members 24', 24" of a shape corresponding to that of the workpiece 24 to be machined, the tubes 24' and 24" having been longitudinally slitted at 85 so as to fit on the rails 15 (see FIG. 17). The ramp members 24', 24" lift and lower the carriage 1 in a more gradual manner conforming to the desired shape of the workpiece.

Figure 18:
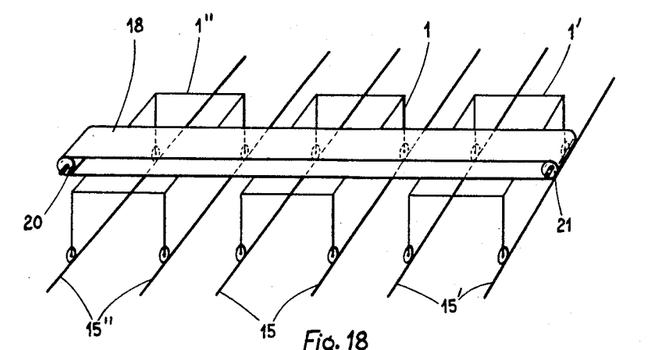
FIG. 18 is a somewhat diagrammatic perspective view illustrating the juxtaposition of several carriages in a machine of the type shown in FIG. 1.

FIG. 18 illustrates diagrammatically the juxtaposition of three identical carriages 1, 1', 1" movable on respective rails 15, 15', 15", the abrasive tape 18 extending across the three tracks so that the workpieces of all the carriages can be machined simultaneously. Also, in this figure, the tape 18 has been shown by way of example as moving above the carriages.

Figure 19:
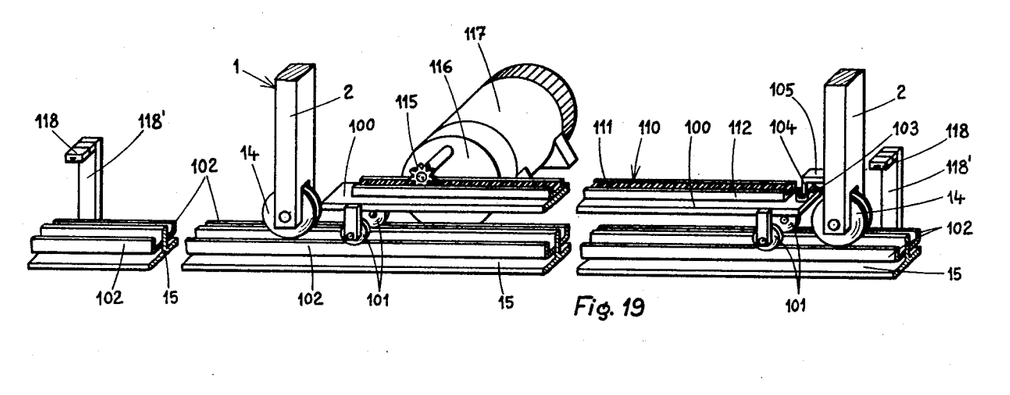
FIG. 19 is a fragmentary perspective side view illustrating a system for reciprocating a carriage along its rails.

FIG. 19 illustrates an assembly for moving the carriage 1 along its rails 15 without interfering with the vertical mobility of the carriage as required, for example, in the machining of tapering workpieces by a system as shown in FIGS. 15–17. The rail 15 is shown flanked by an auxiliary track 102 engaged by wheels 101 on a runner 100 which is disposed between the fore and aft legs 2 of the carriage 1. One of these legs is shown provided with a lug 105 of inverted L-shape whose vertical arm 104 engages in a U-shaped bracket 103 on runner 100. This runner rigidly supports a rack 110 meshing with a pinion 115 which is coupled with a drive motor 117 via a reduction gearing 116; rack 110 is advantageously composed of chain links 111 welded in place within a trough-shaped member 112. A pair of limit switches 118, supported on arms 118', are connected in circuit with motor 117 to reserve its rotation whenever one of the legs 2 contacts one of the switches 118, the position of these switches being preferably adjustable. These limit switches are of course representative of various arrangements for reciprocating the runner 100 along its track 102.

The apparatus herein described may be provided with means for spraying the abrasive surface of its tape 18 with liquid; it may also include suitable means for lubricating its movable parts. Furthermore, the specific arrangements described and illustrated may be modified in a variety of ways without departing from the spirit and scope of the invention as defined in the appended claims.

I claim:

1. A machine for working the surface of elongated workpieces, comprising carriage means to provide with at least one rectangular frame, legs depending from said frame and wheels mounted on said legs, rail means extending parallel to two sides of said rectangular frame in engagement with said wheels for movement of said carriage means therealong, a first and a second set of pins disposed on the remaining sides of said rectangular frame in mutual alignment for jointly supporting therebetween a plurality of workpieces to be worked on, means operatively connected to one of said sets of pins for rotating same, an endless surface-working member disposed in substantially perpendicular relationship with respect to said two sides between said rectangular frame and said rail means, means for displacing said endless member transversely to said two sides, means engaging said erdless member to maintain the latter against said workpieces, said legs being provided with adjustment means for varying the elevation of said rectangular frame relative to that of said endless member, and means for moving said carriage means together with said workpieces along said rail means with respect to said endless member during engagement thereof with said workpieces.

2. A machine as defined in claim 1 wherein said carriage means includes a plurality of carriages with individual frames disposed alongside one another, said working member extending across all of said frames.

3. A machine for working the surface of elongated workpieces, comprising substantially horizontal rail means, a carriage provided with wheels supported on said rail means, a first and a second set of juxtaposed workpiece-holding elements rotatable about coplanar axes and disposed in mutual alignment at two locations on said carriage spaced apart in the direction of said rail means for substantially horizontally supporting between them a plurality of workpieces parallel to said rail means, drive means coupled with one of said sets for imparting rotation to said workpieces, an endless abrasive tape disposed in a direction substantially transverse to said rail means and provided with a substantially horizontal run having an operating surface close to the plane of said axes, a pair of rollers on opposite sides of said carriage embraced by said tape, a set of pressure elements positioned between said rollers close to said run for deflecting said operating surface toward said workpieces, a support for said pressure elements, mounting means for said support enabling vertical displacement of said pressure elements, operating means coupled with said support for changing the elevation of said pressure elements in a manner bringing said tape to bear upon said workpieces, and actuating means coupled with one of said rollers for driving said belt.

4. A machine as defined in claim 3 wherein one of said sets of workpiece-holding elements are axially displaceable on said carriage and are provided with common retraction means for releasing said workpieces.

5. A machine as defined in claim 3 wherein said support comprises a horizontal frame, said pressure elements spanning said frame and extending parallel to said rail means in interleaved relationship with said axes.

6. A machine as defined in claim 5 wherein said frame is further provided with a tensionable belt interposed between said pressure elements and said run of said tape.

7. A machine as defined in claim 3, further comprising ramp means on said rail means ascendable by said wheels in certain positions of said carriage for enabling said tape to operate on tapered surface portions of said workpieces.

8. A machine for working the surface of elongated workpieces, comprising substantially horizontal rail means including a main track and an auxiliary track alongside said main track, a carriage provided with wheels supported on said main track, a first and a second set of juxtaposed workpiece-holding elements rotatable about parallel horizontal axes and disposed in mutual alignment at two locations on said carriage spaced apart in the direction of said rail means for supporting between them a plurality of workpieces parallel to said rail means, drive means coupled with one of said sets for imparting rotation to said workpieces, an endless surface-working member disposed in a direction substantially transverse to said rail means for surface contact with said workpieces, actuating means for driving said member, ramp means on said main track ascendable by said wheels in certain positions of said carriage for enabling said member to operate on tapered surface portions of said workpieces, a runner supported on said auxiliary track, coupling means interconnecting said runner and said carriage with freedom of relative vertical displacement whereby said carriage remains tied to said runner while moving over said ramp means, and mechanism for reciprocating said runner along said auxiliary track, thereby entraining said carriage.

References Cited in the file of this patent
UNITED STATES PATENTS

| | | |
|---|---|---|
| 330,890 | Gilbert | Nov. 24, 1885 |
| 1,891,279 | Hauk | Dec. 20, 1932 |
| 2,667,901 | Salstrom et al. | Feb. 2, 1954 |
| 2,749,675 | Frank et al. | June 12, 1956 |

FOREIGN PATENTS

| | | |
|---|---|---|
| 163,481 | Australia | Jan. 27, 1955 |